Jan. 15, 1963  R. E. BIRDSALL  3,073,612
COLLET DRIVING HEAD
Filed Aug. 8, 1961
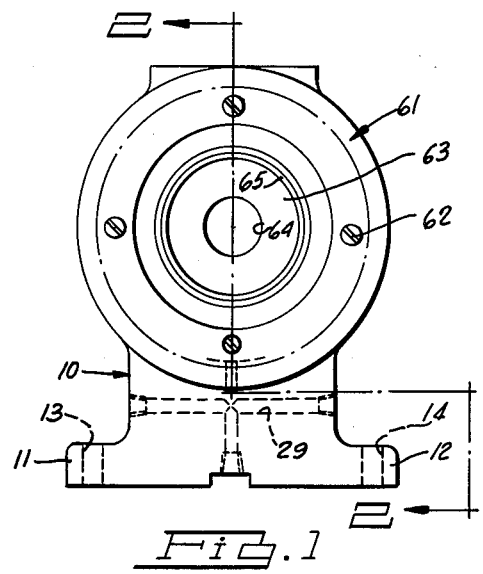
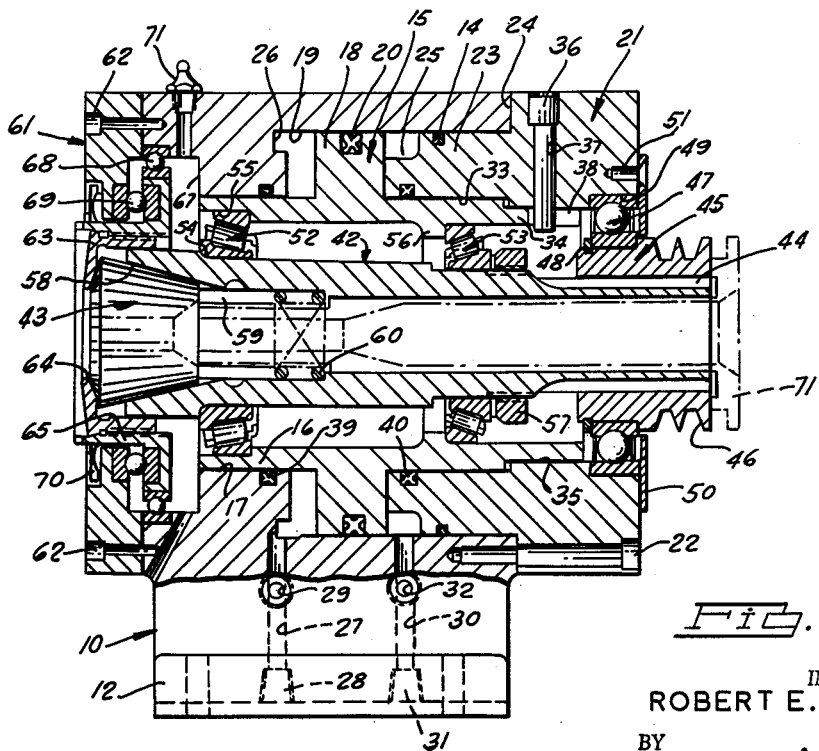
INVENTOR.
ROBERT E. BIRDSALL
BY
Donnelly, Mentag & Harrington
ATTORNEYS

United States Patent Office 3,073,612
Patented Jan. 15, 1963

3,073,612
COLLET DRIVING HEAD
Robert E. Birdsall, St. Clair Shores, Mich., assignor to Enterprise Machine Parts Corporation, Detroit, Mich., a corporation of Michigan
Filed Aug. 8, 1961, Ser. No. 130,017
2 Claims. (Cl. 279—4)

This invention relates generally to fluid operated chucks for machine tools, and more particularly, to a collet driving head or chuck or the type in which a workpiece is gripped by a contractible and expansible collet. Still more particularly, the invention contemplates the provision of means for operating such a collet driving head by air or hydraulic fluid under pressure.

It is an important object of the present invention to provide a fluid pressure operated collet driving head which is extremely simple and compact in construction, economical of manufacture, and which is positive and accurate in operation.

It is another object of the present invention to provide an improved and novel collet driving head which may be readily incorporated in any standard lathe, shaving machine, or like machine tool in which work piece chucks are regularly used.

It is a further object of the present invention to provide a novel and improved collet driving head or chuck which incorporates a fixed position collet and a longitudinally movable driving sleeve for opening and closing the collet.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is a front elevational view of a collet driving head made in accordance with the principles of the invention; and, FIG. 2 is an enlarged, partial, elevational sectional view of the structure illustrated in FIG. 1, taken along the line 2—2 thereof and looking in the direction of the arrows.

Referring now to the drawing wherein is illustrated a preferred embodiment of the invention, the numeral 10 generally indicates a housing which is provided on the lower end thereof with the sidewardly, outwardly extended projections 11 and 12 which are provided with bolt holes 13 and 14, respectively, for inserting suitable bolts for securing the driving head on a machine tool. The housing 10 is provided with a fluid operated piston generally indicated by the numeral 15 for opening and closing the collet as more fully described hereinafter.

The piston 15 includes a tubular or cylindrical body portion 16 and which is slidably mounted along the forward end thereof in the annular chamber 17 in the housing 10. The piston 15 is further provided with the substantially centrally disposed peripheral ring 18 which extends outwardly, sidewardly from the cylindrical portion 16 and into the enlarged annular chamber 19. The chamber 19 communicates with the annular chamber 17. The peripheral ring portion 18 is provided with the annular sealing means 20 which may be of any suitable type. The chamber 19 forms a fluid pressure cylinder as more fully described hereinafter and is open at the rear end thereof.

As shown in FIG. 2, the rear end of the chamber 19 is enclosed by a circular retainer generally indicated by the numeral 21. The retainer 21 is fixedly secured to the rear end of the housing 10 by any suitable means as by means of the bolts 22. The circular retainer 21 is provided with a reduced portion 23 which extends inwardly into the rear end of the chamber 19 and which forms a shoulder 24 that abuts against the rear end of the housing 10. As shown in FIG. 2, the inner end of the retainer extension 23 forms the rear wall chamber 19. The outer rear edge of the retainer extension 23 is relieved as indicated by the numeral 25 to form a fluid inlet as more fully described hereinafter. As shown in FIG. 2, the front wall of the chamber 19 is relieved at the periphery thereof to form the inlet annular recess 26 to form an inlet for the fluid pressure.

As shown in FIGS. 1 and 2, the annular inlet recess 26 is in communication with the bore or passage 27 that extends upwardly from the lower end of the housing 10. The lower end of the passage 27 is closed by any suitable plug means 28. The fluid passage 27 communicates with the transverse fluid passage or bore 29 and this passage would be operatively connected to a suitable source of fluid passage as hydraulic fluid or air under pressure. It will be seen that one end of the passage 29 would be hooked to the fluid pressure source and the other end could be plugged by any suitable means. When fluid is admitted to the passage 29, it will pass through the passage 27 into the front end of the chamber 19 to exert a pressure on the piston 15 and move it rearwardly or to the right as viewed in FIG. 2. A second vertical bore or passage 30 is formed in the housing 10 and communicates at its upper end with the fluid inlet recess 25. The lower end of the passage 30 is enclosed by any suitable means as by the plug 31. A second transverse passage 32 similar to the passage 29 is in communication with the vertical passage 30 for admitting and exhausting fluid to and from the rear end of the chamber 19. It will be seen that the transfer passages 29 and 32 may be operatively connected to a suitable source of fluid pressure whereby fluid may be admitted and exhausted into the front and rear ends of the chamber 19 so as to move the peripheral ring 18 and the annular portion 16 forwardly and backwardly as desired.

As shown in FIG. 2, the rear end of the cylindrical or tubular portion 16 of the piston 15 is slidably mounted in the circular opening 33 formed through the retainer 21. The extreme rear end of the piston tubular portion 16 is reduced as indicated by the numeral 34 and this reduced portion is slidably mounted in the smaller diameter, stepped portion 35 of the passage through the retainer 21. The piston 15 is retained against rotation by means of the set screw 36 which extends inwardly through the hole 37 in the retainer 21 and through the longitudinally formed slot 38 in the rear end of the piston tubular portion 16. As shown in FIG. 2, a pair of sealing rings 39 and 40 are positioned in the housing 10 and in the retainer 21 so as to form a sealing engagement with the outer periphery of the piston tubular portion 16. A sealing ring means 41 of any suitable type is also provided in the periphery of the retainer extension 23 so as to form a sealing engagement with the peripheral surface of the chamber 19.

Rotatably mounted in the longitudinally movable piston 15 is the sleeve spindle 42 which functions as a means for locking the workpiece holding collet 43 and also for rotatably driving the same. As shown in FIG. 2, the sleeve spindle 42 is provided with the splines 44 on the rear end thereof on which is slidably mounted the drive sheave or pulley 45. The sheave 45 is provided with V-grooves 46 for operative driving engagement with a suitable power source by means of conventional V-belts. The drive sheave 45 is rotatably mounted in the rear end of the retainer 21 by the following described structure. A ball bearing means is generally indicated by the numeral 47 and is fixedly mounted on the rear end of the sheave 45 against longitudinal movement by means of the retainer clip 48. The outer race of the ball bearing means 47 is seated in the annular recess 49 in the retainer 21. The outer race of the ball bearing means 47 is retained in the recess 49 by means of the retainer ring 50 which is suitably secured to the rear face of the retainer 21 by any suitable means, as by means of the screws 51. As shown in FIG. 2, the rear end of the piston tubular portion 16 is in its most rearwardly disposed position and the rear end thereof is disposed adjacent the front end of the retainer clip 48.

The sleeve spindle 42 is rotatably mounted in the piston 15 but is held against longitudinal movement relative thereto by means of the following described structure. The sleeve spindle 42 is rotatably mounted adjacent its forward end by means of the tapered roller bearing means 52 and at the rear end thereof by means of the tapered roller bearing means 53. The bearing means 52 has its inner race seated against the shoulder 54 on the forward end of the sleeve spindle 42. The outer race of the bearing means 52 is seated in an enlarged recess 55 formed in the front end of the piston tubular portion 16. The rear bearing means 53 has its outer race mounted inside of the piston tubular portion 16 and against the inwardly projecting annular stop ring 56. The bearing means 53 is secured in place against the ring or shoulder 56 by means of the threadably mounted lock ring 57 which is threadably mounted on the rear end of the sleeve spindle 42 and which bears against the rear end of the bearing means 53. It will be seen that when the piston 15 is moved forwardly or backwardly, the sleeve spindle 42 would be moved accordingly and will be moved relative to the sheave 45 by means of the splines 44.

The workpiece holding collet 43 may be of any suitable conventional type and a preferable collet is one which is called a "Rubber Flex" collet and which is available on the market and sold by the Jacobs Manufacturing Company, of West Hartford, Connecticut. The collet 43 has the usual rearwardly and inwardly tapering surface which is adapted to be seated in the forwardly and outwardly tapered portion 58 of the opening formed through the sleeve spindle 42. As shown in FIG. 2, a sleeve spacer 59 is disposed inside the sleeve spindle 42 and engages the rear end of the collet 43. The spacer sleeve 59 is provided with a continuous forward bias by means of the spring 60 which is seated in the opening formed through the sleeve spindle 42 and which engages the rear end of the spacer sleeve 59.

The collet 43 and the front end of the sleeve spindle 42 extend outwardly, forwardly from the front end of the housing 10. The front end of the housing 10 is enclosed by the cover member 61 which is secured to the housing 10 by any suitable means as by means of the bolts 62. It will be seen that the spring 60 maintains an outwardly, forwardly directed bias on the collet 43 and the collet 43 is prevented from moving out of the sleeve spindle 42 by means of the nut indicated by the numeral 63. The nut 63 has an opening 64 through the front end thereof to permit workpieces to be inserted into the collet 43. The nut 63 has the inwardly extended sleeve portion 65 which is adapted to be threadably engageable with the threaded bore formed through the collar 66. The collar 66 is rotatably mounted in the recess 67 formed on the front end of the housing 10 by means of the conventional ball bearing means 68. The collar 66 is provided with a thrust bearing means 69 which is disposed on the front side thereof and which has the outer race thereof operatively mounted in the front housing cover 61. As shown in FIG. 2, a suitable oil seal 70 is mounted in the forward side of the cover 61 around the collar 66. A conventional lubrication fitting 71 is provided in the housing 10 for inserting suitable lubrication fluid or grease into the space 67.

In use, the sheave 45 would be connected by any suitable drive belts to a driving means for rotating the sleeve spindle 42 and the collet 43. The numeral 71 indicates an adapter tube which could be used for feeding workpieces into the collet 43 from the rear end of the collet driving head. The projection of the workpiece through the collet may be governed by any suitable means as by a suitable stop rod mounted on a machine tool. In order to lock a workpiece into the collet 43, the fluid under pressure would be admitted to the front end of the piston cylinder as through the passages 29 and 27 to force the piston 15 rearwardly. This action will carry the sleeve spindle 42 rearwardly so as to open the collet 43 and permit a workpiece to be inserted therein. When the workpiece is to be clamped into the collet 43, the fluid under pressure will be reversed so as to exhaust the fluid from the forward end of the piston cylinder 19 and admit it to the rearward end through the passages 32 and 30 to force the piston 15 forwardly, or to the left as shown in FIG. 2. It will be seen that when the piston 15 moves forwardly, the sleeve spindle 42 is also carried along with it so as to have the tapered surface 58 slide forwardly on the collet 43 to lock it against the workpiece.

It will be understood that the collet driving head of the present invention may also be used with a conventional bar feed mechanism for feeding bar workpieces therethrough rather than loose workpieces. The workpiece may also be fed into the collet from the collet end of the driving head if desired. When the workpieces are fed from the forward end of the collet into the collet, a suitable stop means or positioning means may be inserted inside of the sleeve spindle 42. It will be seen that the collet 43 does not move forwardly or backwardly when it is being loaded or unloaded but it remains in a fixed position relative to the other structure of the driving head. The sleeve spindle 42 moves forwardly and backwardly with the piston 15 to open or close the collet.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A collet driving head, comprising: a housing; a fluid piston operatively mounted in said housing for forward and rearward longitudinal movement; a sleeve spindle rotatably mounted in said piston; means for holding the sleeve spindle in said piston against longitudinal movement relative to said piston; drive means operatively mounted on the rear end of said sleeve spindle for rotating the sleeve spindle; a collet carried in the forward end of said sleeve spindle; and, means for holding the collet in a fixed position against longitudinal movement relative to said housing when the sleeve spindle is moved forwardly and readwardly longitudinally to close and open the collet respectively.

2. The collet driving head as defined in claim 1, wherein: said means for holding the collet in a fixed position against longitudinal movement includes a stop means rotatably mounted in said housing and disposed in engagement with the front end of the collet; and, a biasing means in said sleeve spindle for maintaining a forwardly directed bias on the rear end of the collet.

References Cited in the file of this patent

UNITED STATES PATENTS

| | | |
|---|---|---|
| 2,587,230 | Schaad | Feb. 26, 1952 |
| 2,606,767 | Preston | Aug. 12, 1952 |
| 2,674,461 | Gamet | Apr. 6, 1954 |